United States Patent
Molini et al.

(10) Patent No.: US 6,353,385 B1
(45) Date of Patent: Mar. 5, 2002

(54) METHOD AND SYSTEM FOR INTERFACING AN INTRUSION DETECTION SYSTEM TO A CENTRAL ALARM SYSTEM

(75) Inventors: James Molini, Newark; Philip R. Moyer, Hockessin, both of DE (US); Nathan L. Seidenman, Coconut Creek, FL (US)

(73) Assignee: Hyperon Incorporated, Wilmington, DE (US)

( * ) Notice: Subject to any disclaimer, the term of this patent is extended or adjusted under 35 U.S.C. 154(b) by 0 days.

(21) Appl. No.: 09/648,018

(22) Filed: Aug. 25, 2000

(51) Int. Cl.[7] ............................................. G08B 29/00
(52) U.S. Cl. ........................ 340/506; 340/502; 340/541
(58) Field of Search ................................. 340/505, 506, 340/531, 534, 539, 541, 502; 379/39, 45, 49, 33, 37; 713/201

(56) References Cited

U.S. PATENT DOCUMENTS

| | | | |
|---|---|---|---|
| 3,662,371 A | 5/1972 | Lee et al. ................... 367/93 |
| 4,057,798 A | 11/1977 | Ellson ........................ 340/511 |
| 5,039,980 A | * 8/1991 | Aggers et al. ............... 340/506 |
| 5,557,742 A | 9/1996 | Smaha et al. ............... 713/200 |
| 5,590,181 A | 12/1996 | Hogan et al. ............... 379/114 |
| 5,796,942 A | 8/1998 | Esbensen .................... 713/201 |
| 5,872,912 A | 2/1999 | Brownmiller et al. ........ 714/47 |
| 5,905,459 A | * 5/1999 | Bunch ......................... 342/92 |
| 5,983,350 A | * 11/1999 | Minear et al. .............. 713/201 |
| 5,991,881 A | * 11/1999 | Conklin et al. ............. 713/201 |
| 5,999,179 A | 12/1999 | Kekic et al. ................ 345/349 |
| 6,054,920 A | * 4/2000 | Smith et al. ................ 340/506 |

* cited by examiner

*Primary Examiner*—Van T Trieu
(74) *Attorney, Agent, or Firm*—Brinks Hofer Gilson & Lione

(57) ABSTRACT

An alarm interface system and method receives intrusion alarm messages from an intrusion detection system. The alarm interface system organizes a group of the intrusion alarm messages into a time sequence. A highest priority alarm message is selected from the group. An analyzer analyzes the highest priority alarm message to extract raw locale information. The raw locale information is translated into refined locale information (e.g., a zone identifier) for inclusion in a central station-compatible data message.

35 Claims, 3 Drawing Sheets

METHOD AND SYSTEM FOR INTERFACING AN INTRUSION DETECTION SYSTEM TO A CENTRAL ALARM SYSTEM

BACKGROUND OF THE INVENTION

A central alarm system refers to a burglar alarm, a fire alarm, a combination of a burglar alarm and a fire alarm, or another alarm system that includes a central station. The central station facilitates monitoring of the status of at least one alarm by a human operator. The central station may be monitored by trained operators in attendance at most or all times. For example, if a fire alarm is triggered, the operator may confirm the presence of a fire in a building and call the local fire department. Further, an operator may dispatch a runner or an alarm investigator to make an investigation of unauthorized entry or opening of protected properties from which signals are received.

The central alarm system supports the operation of electrical protection circuits and devices, such as sensors. The central station supports one or more of the following functions of the electrical protection circuits and devices: signaling, communications, maintenance, control, and supervision. For example, the central station may control the arming and disarming of the central alarm system or affiliated devices. Further, the central station may support the recording of alarm status information communicated between the central station and the electrical protection circuit or device.

An intrusion detection system monitors for a breach of security of one or more protected computers, which are susceptible to attack from a communications network (e.g., Internet). A protected computer refers to a computer that is protected against unauthorized activity by an associated firewall, internal access control system, or another security measure. A firewall encompasses software instructions, computer hardware, or both that filter traffic on a communications network to allow authorized traffic to pass through the firewall, while providing a barrier for unauthorized traffic. When an intrusion or other suspicious event is detected, the intrusion detection system creates an alarm that may represent a reportable event for presentation to human operators.

In the prior art, the intrusion detection system may not be an effective barrier to illicit activity unless a person monitors the intrusion alarms on a realtime basis as an intrusion is occurring. For example, if a technician is aware that a protected computer is under imminent or present attack, a skilled technician could ameliorate the problem by imposing new security constraints in response to the attack. However, several technical obstacles prevent the intrusion alarms from being monitored on a real-time basis. The intrusion detection system may produce cryptic alarm data that requires deciphering of codes that are not readily understandable without referring to reference manuals. Thus, a security guard or dispatcher may not have the appropriate technical sophistication, training, or time to sort through the alarm report provided by the intrusion detection system. The intrusion detection system may produce large volumes of intrusion alarm messages that can quickly overwhelm a technically sophisticated user, such as an information systems professional. Although some intrusion detection systems provide web-based notification to human operators, many prior art intrusion detection systems generally fail to provide reliable and secure event routing to support large-scale call centers.

Thus, a need exists for integrating the intrusion detection system with a central alarm system so that only significant alarms from the intrusion detection system are presented to the operator at a user console for immediate attention.

BRIEF SUMMARY OF THE INVENTION

In accordance with the invention, an alarm interface system and method receives intrusion alarm messages from an intrusion detection system. The alarm interface system organizes a group of the intrusion alarm messages into a time sequence. A highest priority alarm message is selected from the group. An analysis process analyzes the highest priority alarm message to extract raw locale information. The raw locale information may be translated into refined locale information (e.g., zone identifier) for inclusion in a central station-compatible data message.

The presence of the zone identifier in the central station-compatible data message allows the intrusion detection system to be compatible with the context of a central alarm system that supports burglar alarms, fire alarms, or both. Accordingly, an operator of a user console may readily interpret a highest priority intrusion alarm message in substantially the same manner as a conventional burglar alarm or a fire alarm, where technicians or other security countermeasures can be deployed for an indicated location.

The method and the alarm interface system of the invention facilitates integration of an intrusion detection system and a central alarm system to realize labor efficiencies, equipment efficiencies, or both. The alarm interface system permits an intrusion detection system to use or share existing outbound call routing technology, which is available for monitoring environments associated with burglar alarms. Thus, the alarm interface system is well suited for providing cost-effective monitoring of computer-related alarms from the intrusion detection system. The alarm interface system promotes reduced labor costs by leveraging the presence of the operator who mans the central alarm system to monitor the intrusion alarm system too. Further, the alarm interface system promotes reliability in monitoring the intrusion alarm system by exploiting the fault tolerant and redundant architecture that is often representative of the central alarm system that supports fire alarms, burglar alarms, or both.

An operator equipped with the appropriate intelligible presentation of computer alarms may react quickly prevent substantial economic harm that might otherwise occur from malicious or destructive tampering with a business entity's internal data. Further, an operator equipped in this way can take remedial action in response to a denial of service attack that is specific to a computer network or host. A denial of service attack is designed to make a computer system or network unavailable for normal use by flooding the computer system with incoming data messages. A quick and successful response to a denial of service attack requires continuous monitoring of protected computers and effective reporting of events indicative of a denial of service attack.

DETAILED DESCRIPTION OF THE INVENTION

Figure 1:
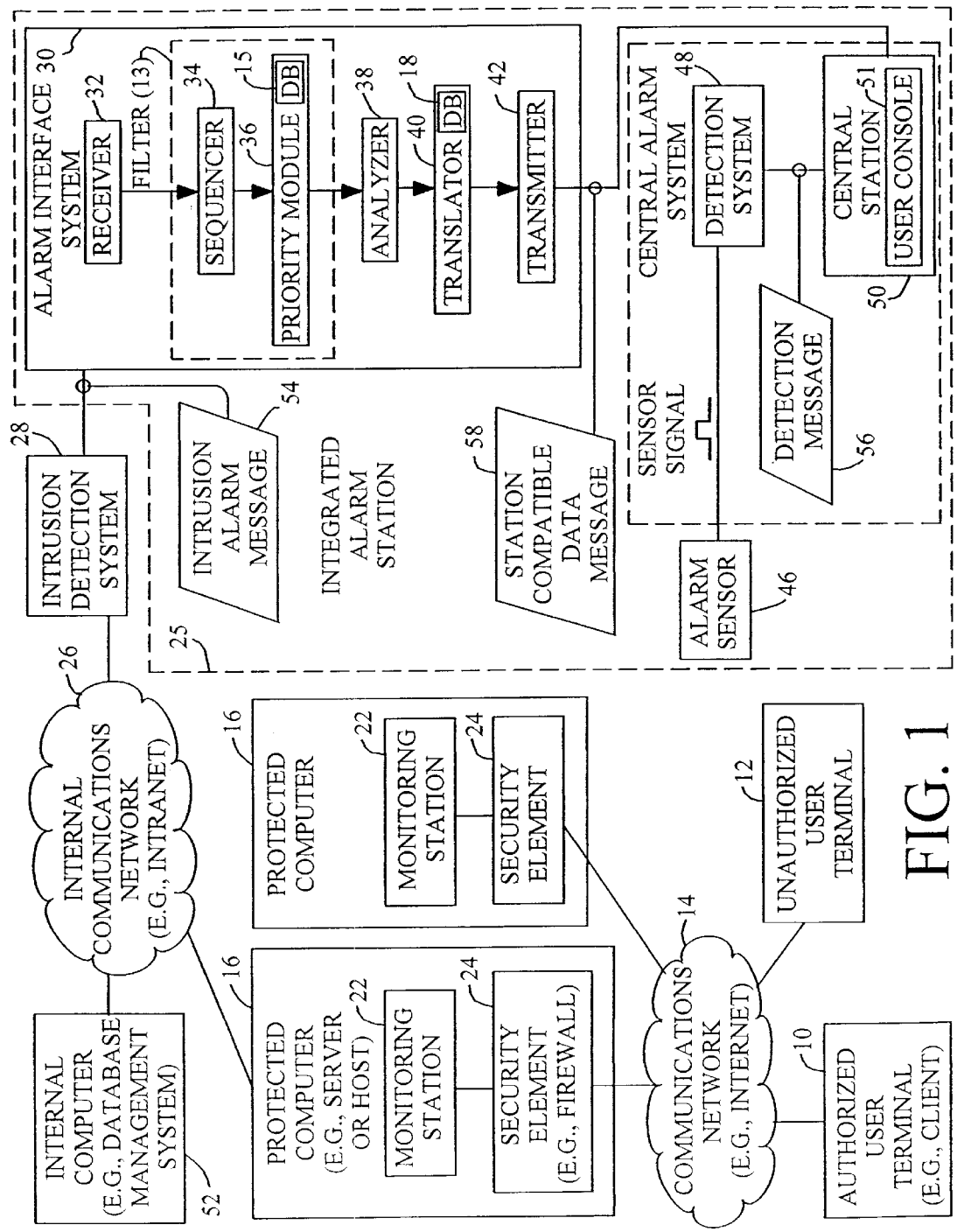
FIG. 1 is a block diagram of the integral combination of an intrusion detection system and a central alarm system in accordance with the invention.

The definitions set forth in the foregoing background section apply to the entire specification. In accordance with the invention, an authorized user terminal 10, an unauthorized user terminal 12, or both communicate with a protected computer 16 via a communications network 14 (e.g., Internet). The authorized user terminal 10 may represent a client and the protected computer 16 may represent a host or a server that is authorized to grant access to the authorized user terminal 10. The protected computer 16 includes or is associated with a security element 24 (e.g., firewall) to prevent the unauthorized user terminal 12 from accessing the protected computer 16. Although two protected computers 16 are shown in FIG. 1, in practice virtually any number of protected computers 16 may be coupled to the communications network 14.

At least one protected computer 16 is arranged to access an internal communications network 26 (e.g., intranet). The internal communications network 26 may include an intranet, a data packet network, a local area network (LAN), a wide area network (WAN), or the like. The internal communications network 26 may be coupled to an internal computer 52 (e.g., a database 18 management system) and an integrated alarm station 25. The internal computer 52 may contain internal data that is not otherwise generally available to the public. For example, the internal data may comprise proprietary data about a business entity, a customer list of a business entity, financial information of a business entity, or the like.

The intrusion detection system 28 refers to a data processing system for monitoring an unauthorized intrusion into one or more of the protected computer 16 systems. The intrusion detection system 28 need not, but may, generate alarm messages that conform to Internet Engineering Task Force (IETF) standards for intrusion alarms. Each protected computer 16 system is susceptible to attacks or unauthorized intrusions over a communications network 14 (e.g., Internet) because the protected computer 16 systems are adapted to communicate over the communications network 14.

Monitoring stations 22 are associated with corresponding protected computers 16. The monitoring station 22 refers to a monitoring software program resident in the protected computer 16, monitoring hardware affiliated with a corresponding protected computer 16, or both software and hardware. The intrusion detection system 28 communicates to one or more monitoring stations 22 via the internal communications network 14 to determine if unauthorized activity is present. For example, the intrusion detection system 28 may receive data packets or data blocks transmitted from one or more monitoring stations 22. The data packets or blocks may contain data on unauthorized activity, such as attempts of the unauthorized user terminal 12 to access one or more protected computers 16. In one example, the intrusion detection system 28 polls the monitoring stations 22 for alarm data via the internal communications network 14. In another example, the monitoring stations 22 transmit alarm data on a contention basis or as alarms are detected.

The intrusion detection system 28 is coupled to the alarm interface system 30 of the integrated alarm station 25. The integrated alarm station 25 includes an alarm interface system 30 coupled to a central alarm system 44. In practice, the alarm interface system 30 and the central alarm system 44 may be co-located at a single site.

An alarm interface system 30 refers to a data processing system that interfaces the intrusion detection system 28 to the central alarm system 44. The alarm interface system 30 accepts input of the intrusion alarm messages 54 and processes them to form one or more central station-compatible data messages. The alarm interface system 30 filters the inputted intrusion alarm messages 54 and structures the intrusion alarm messages 54 as central station-compatible data messages 58.

A central alarm system 44 refers to an alarm system that includes a central station 50 that is affiliated with one or more alarm sensors 46 for monitoring the status of a building, equipment, or another tangible object. The alarm sensors 46 are coupled, via wires or via electromagnetic waves, to a detection system 48. In turn, the detection system 48 is coupled to a user console 51 for presentation (e.g., display) of the status of alarms to a monitoring user or operator.

In one embodiment, a central alarm system 44 may refer to a conventional burglar alarm system, a fire conventional alarm system, or both. For example, a conventional fire alarm system may have a panel with optical sources (e.g., light-emitting diodes) that emit light to indicate a fire within a particular zone. In this configuration, the panel may generate electrical signals that are monitored by the central station 50 and processed for display on the console 51 of an individual alarm operator. The alarm may be configured to remain active until reset or appropriate action is taken.

In another embodiment, central alarm system 44 may meet Underwriter Laboratory (UL) specifications for burglar alarms, fire alarms, or both. The alarm interface system 30 and the process of the invention is intended to interface intrusion detection systems (e.g., intrusion detection system 28) in a manner that preserves the UL certification of any participating central alarm system that would otherwise support UL-compliant fire alarms, UL-compliant burglar alarms, or both. The ability to route alarms in a manner that meets UL specifications permits a wider use of intrusion detection systems (e.g., intrusion detection system 28) in the traditional security industry.

The detection system 48 identifies whether or not an alarm sensor 46 is tripped or detects a certain status related to the monitored subject. The detection system 48 may send a detection message 56 to the central station 50. The central station 50 processes the detection message 56 and presents a corresponding alarm to an operator. The operator monitors the central alarm system 44 to respond to any alarms that are triggered. The central station 51 may support the routing of different alarms to different corresponding operators, alarm investigators, or both.

The intrusion detection system 28 monitors monitoring stations 22 to determine whether the security element 24 of a protected computer 16 has been usurped by an unauthorized user. The security element 24 may include a firewall, a login and password authentication procedure, or another technique to prevent the unauthorized user terminal 12 from gaining access to the protected computer 16 or an internal computer 52 networked with the protected computer 16.

In one example, the intrusion detection system 28 may read logs of activity reported by a security element 24. The intrusion detection system 28 may determine if an unauthorized user terminal 12 has attempted or is attempting to conduct a port scan of the security element 24 or the protected computer 16. A port scan refers to a procedure where the unauthorized user terminal 12 attempts to connect to an assortment of logical service interface points or ports of a protected computer to identify the services that a protected computer 16 is actively running at a certain time.

The intrusion detection system 28 outputs intrusion alarm messages 54 to the alarm interface system 30 in response to the detection of unauthorized activity via a monitoring station 22. The intrusion alarm message 54 may include one or more of the following items: location or attributed source of the attack, destination of the attack, time stamp for when the attack occurred, type of the event or intrusion, descriptive information, and alarm flags. The intrusion alarm message 54 may have a data structure such as a file or a data block.

The alarm sensor 46 may provide an electronic signal, a contact closure, a current loop signal, or another indication of the presence or absence of an alarm condition. The alarm condition typically represents the presence of an occurrence, such as a fire, a break-in, or the like. A detection system 48 interprets the foregoing indicator of an alarm condition.

Now that the overall operation of the intrusion detection system 20 and the central alarm system 44 have been discussed, the alarm interface system 30 will be discussed in greater detail. The alarm interface system 30 refers to a data processing system or a computer that has software instructions for filtering intrusion alarm messages and converting filtered intrusion alarm messages into central station-compatible data messages. The blocks shown in the alarm interface system 30 may represent software components, hardware devices, at least one data processing device, or any combination of the foregoing items.

The alarm interface system 30 includes a receiver 32 for receiving an intrusion alarm message 54 from an intrusion detection system 28. A sequencer 34 organizes a received group of the alarm messages into a time sequence. A priority module 36 selects a highest priority alarm message from the group. A filter 13 is formed by a combination of the priority module 36 in communication with the sequencer 34. A translator 40 translates raw locale information on the attack that is indicated by the selected highest priority alarm message into corresponding refined locale information (e.g., a zone identifier or another suitable format for presentation by a central alarm system 44). Locale information may include at least one of a destination indicator (e.g., address) and a source indicator (e.g., address).

An unauthorized user terminal 12 may attempt to gain access to the protected computer 16. For example, the unauthorized user terminal 12 may scan for ports on the firewall, instigate overflow buffer attacks, or engage in other practices to gain improper access to the protected computer 16 or the affiliated internal computer 52. The intrusion detection system 28 may generate an intrusion alarm message 54 in response to an unauthorized user's attempts to gain access to a protected computer 16, regardless of whether the attempt is ultimately successful or not.

The receiver 32 may provide a buffer for temporarily storing intrusion alarm messages 54 for the sequencer 34 in accordance with the processing capacity of the sequencer 34. For example, the receiver 32 holds and stores the intrusion alarm messages in a manner that prevents loss of data.

The sequencer 34 organizes a group of intrusion alarm messages 54 into a sequential group of intrusion alarm messages based on time stamps associated with corresponding intrusion alarm messages 54. The time stamp preferably indicates the time when an unauthorized activity or attack was first discovered or subsequently detected. In one embodiment, the sequencer 34 organizes a sequential group of alarms so that the intrusion alarm messages have the closest time stamps to each other.

The sequential group may be affiliated with a maximum duration for the intrusion alarm messages 54 in a sequential group. Alternately, the sequential group may include a maximum number of intrusion alarm messages 54 within the sequential group. The duration of the sequential group is adjustable to a certain extent. However, the duration of the sequential group is generally set in a manner that does not exceed a maximum aggregate polling period for polling the monitoring stations 22 affiliated with the intrusion detection system 28. For example, in practice, the intrusion detection system 28 may have maximum aggregate polling period of 30 to 50 minutes.

In an alternate embodiment, the sequencer 34 organizes the alarms into a sequential group based on a time of receipt, as opposed to a time stamp, of a data message at the intrusion detection system 28 from a monitoring station 22.

A priority module 36 reviews the alarms in each sequential group. The priority module 36 selects a highest priority alarm within the sequential group. In an alternate embodiment, the priority module 36 reviews the sequential group of alarms and selects a subgroup of highest priority alarms to be transmitted.

Because the alarm interface system 30 accomplishes filtering through the priority module 36, the number of intrusion alarm messages 54 generated by the intrusion detection system 28 may greatly exceed the number of central station-compatible data messages 58 outputted from the alarm interface system 30 to the central alarm system 44. The sequencer 34 and the priority module 36 form a filter 13 for filtering incoming data messages. The filter 13 blocks or deletes certain incoming data messages from subsequent transmission via the transmitter 42 to prevent overwhelming of the central alarm system 44 or the central station 50 with incoming alarm messages. The filter 13 preferably has a filtering capacity commensurate with the alarm generating capacity of the intrusion detection system 28. For example, in certain cases, the intrusion detection system 28 may generate thousands of alarms in a single hour.

The priority module 36 of the alarm interface system 30 filters the intrusion alarm messages 54 so that the central alarm system 44 and the attending operator are not overwhelmed by a large volume of insignificant alarms. In the context of UL-listed central alarm systems, a central alarm system is required to assure reliable alarm delivery and presentation to an operator by appropriate software instructions or otherwise. For the present central alarm system 44, the priority module 36 eliminates likely false alarms or an iterative sequence alarms to foster compliance with UL-listing standards for central alarm systems. In certain cases, for example, a single attack may be conducted against as many as 65,536 different ports, causing up to 65,536 separate intrusion alert messages for the same attack.

The sequencer 34 evaluates the incoming data messages within a window of time to define a sequential group of data messages. Similarly, the priority module 36 evaluates the priority within each sequential group. The window may be determined based on the time of receipt of the incoming data messages arrive at the receiver 32. In one embodiment, the console operator may specify a window of varying duration on a per-system basis. The time window prevents the alarm interface system 30 from waiting for an indeterminate time, expecting a new message to appear from the intrusion detection system 28. In practice, the alarm interface system 30 operates on a series of successive windows.

The priority module 36 determines the highest priority intrusion alarm message 54 within a sequential group in accordance with a priority scheme. The priority scheme represents a predefined criteria for the ranking of the priority of intrusion alarm messages 54. The priority module 36 may assign a priority level to an incoming alarm message based on a characteristic of the incoming alarm message, such as time of receipt of the incoming alarm message at the receiver 32, identity of the incoming alarm message, type of the incoming alarm message, or the like.

The priority scheme evaluates incoming data messages according to several criteria to assign a priority level or to filter the incoming data message. After limiting the incoming messages to a time window or sequential group, the priority module 36 evaluates each alarm message according to one or more of the following criteria: (1) a confidence level in the detection of the alarm and (2) a danger posed by an identified attack. The confidence level is evaluated according to confidence factors. Confidence factors may include past experience with a particular alarm type of intrusion alarm messages 28, the number or percentage of false alarms generated for a particular intrusion alarm messages 28, a quantitative assessment of specific evaluative criteria used to generate the intrusion alarm messages 28, and a qualitative assessment of specific evaluative criteria used to generate the intrusion alarm messages 28. In one example, the confidence level reflects statistical analysis of the processing of historic incoming alarms or intrusion alarm messages. In another example, the confidence level reflects an empirical analysis of historic incoming alarms.

The priority module 36 may estimate a danger level of an attack based on the network address targeted by the attack, the judgment of network operators, and historic occurrences of attacks and their disposition. Where possible, a priority module 36 identifies the network address of the targeted system that was targeted by the attack. The priority module 36 determines or assigns a criticality level to the incoming alarm message according to criteria specified by a network operator of the targeted system. The criticality levels indicate a significance to a network operator concerning an attack upon a corresponding network address. To this end, the priority module 36 may contain a database 15 for storage and retrieval of criticality levels associated with corresponding network addresses.

The priority module 36 may estimate the likelihood of success of the present attack based on the success of previous attacks similar to the present attack. For example, the priority module 36 may evaluate the success of previous attacks at other addresses affiliated with the Internet by exchanging data with Internet Service Providers or other network operators. The priority module 36 may consider the vulnerability of the protected computer or monitored network.

If the likelihood of success meets or exceeds a minimum threshold (e.g., greater than or equal to 10 percent), the priority module 36 may estimate the financial impact or severity of a successful attack on the victim (e.g., business entity) of the attack. For example, the priority module 36 may assign a lower priority to an incoming data message that indicates the detection of probing of the ports of the protected computer 16, whereas the priority module 36 may assign a higher priority for an incoming data message that indicates an unauthorized user's illicit access of records of the internal computer 52 or the protected computer 16 because of the financial severity attendant with the illicit access.

The priority module 36 may resolve a priority conflict between two incoming messages that initially evaluate to the same priority level. Accordingly, the priority module 36 selects the higher priority alarm among the two incoming data messages based on arrival time, elimination of duplication of data messages, reduction of superfluous data messages, and other appropriate factors. In one embodiment, alarms that are not sent to the analyzer 38 and the transmitter 42 are kept in secondary storage for later analysis by the console operator.

In general, the priority scheme may be customized to meet the user preferences and performance goals of the console operator so long as the filtering of the priority module 36 blocks duplicative alarms without deleting or blocking significant alarms that pose a serious threat the data integrity, computer operations, or electronic commerce resources of the business entity. The priority module 36 outputs the highest priority alarm message to the analyzer 38.

The analyzer 38 of the alarm interface system 30 is programmed to recognize the data structure of the intrusion alarm message 54 so that the alarm interface system 30 can readily extract pertinent information from the intrusion alarm message 54. The extraction of pertinent information from the intrusion alarm message 54 preferably occurs in real-time to provide a responsive integrated alarm station 25.

In an alternate embodiment, the alarm interface system 30 may be programmed to recognize a data structure of an open standard to facilitate rapid extraction of relevant information from the intrusion alarm message 54.

The analyzer 38 analyzes the intrusion alarm messages 54 provided by the intrusion detection system 28 to determine characteristics of the attack or unauthorized intrusion upon the protected computer 16. The locale of the attack is one example of a characteristic of the attack or unauthorized intrusion. The intrusion alarm message 54 may define the locale in terms of a source indicator (e.g., source address), a destination indicator (e.g., destination address), or both. The attack of an unauthorized user terminal 12 originates at a source address. The monitoring station 22 may typically detect the attack at or near the destination address of the attack.

In one embodiment, an analyzer 38 assigns a false alarm rate (FAR) probability indicator to the highest priority alarm message to indicate the false alarm rate. Further, an analyzer 3 8 includes a probability detector that assigns a second probability indicator for indicating a probability of having a valid locale for an attack. The analyzer 38 attempts to determine the origination address, the destination address of an attacking message or attack. The analyzer 3 8 may be able to extract a destination address and a source address (i.e., source), or both from the intrusion alarm message 54. The probability of having a valid locale for the attack may be higher if the local is based upon the both the extraction of the destination indicator and the source indicator of the attack from the highest priority intrusion alarm message 54. Conversely, the probability for having a valid locale for the attack may be lower if based solely on the extracted destination indicator or the extracted source indicator. The analyzer 38 communicates with a translator 40.

In an alternate embodiment, the probability detector indicates the false alarm rate and the probability or confidence in the origination address and the destination address.

The translator 40 translates locale information (of the attack) associated with the intrusion alarm message 54 (e.g., highest priority intrusion alarm message 54) into a zone indicator for incorporation into a central station-compatible data message. A database 18 associated with the translator 40 may store a map of relationships between destination addresses, source addresses and corresponding zones. The database 18 may be organized as a relational database 18 or a table.

The translator 40 accesses the relationships in the database 18 to assign a detected attack, represented by the highest priority intrusion alarm message 54, to a specific geographic zone indicator or another indicator compatible with a central station 50. The central alarm system 44 may be equipped with standard provisions for presenting different geographic zones on the user console 51 or otherwise handling central station-compatible data messages 58 with different zone indicators.

In one example, the central alarm system 44 may include approximately 64 zones. In contrast, the intrusion detection system 28 may provide one of many (e.g., 4,200,000) locations as a destination address or a source address of attack affiliated with the highest priority intrusion alarm message 54. Accordingly, the translator 40 facilitates reformatting intrusion alarm message 54 data into a form that is suitable for using the geographic zones of the central alarm system 44. The central alarm system 44 facilitates the creation of zones that match corresponding logical networks on a security element 24 (e.g., firewall) of the protected computer 16, allowing the operator to understand relative risk patterns associated with each distinct attack on a protected computer 16 or a network affiliated therewith.

The database 18 contains relationships among zone identifiers of attacks, destination indicators (e.g., destination addresses) of electronic attacks or security events, and source indicators (e.g., source addresses) of attacks or security events. An intrusion alarm message 54 may contain a destination indicator, a source indicator, or both. A database 18 may contain a mapping of relationships between one or more of the following: (1) a combination of a destination indicator and an origin indicator associated with a corresponding zone, (2) a destination indicator (of an electronic attack or security event) associated with a corresponding zone, and (3) an origin indicator (of an electronic attack or security event) associated with a corresponding zone.

The translator 40 may identify a zone identifier according to various alternative techniques. In general, a translator 40 accesses the database 18 and applies known information about an attack or security event to determine the zone identifier for the attack. Under a first technique, the translator 40 associates a received destination indicator of an attack (described by the highest priority intrusion alarm message 54) with a corresponding zone identifier set forth in the database 18. Under a second technique, the translator 40 associates a received source indicator of an attack (described by the highest priority intrusion alarm message 54) with a corresponding zone identifier set forth in the database 18. Under a third technique, the translator 40 associates the combination of a received source indicator and a received destination indicator of an attack with the corresponding zone identifier in the database 18. The alarm interface system 30 may be coupled to the central alarm system 44 via a serial port, a parallel port, or otherwise.

The transmitter 42 composes the message format of the central station-compatible data message 58 and transmits the central station-compatible data message from the alarm interface system 30 to the central alarm system 44. In one embodiment, the translator 40 cooperates with the transmitter 42 to create a central station-compatible data message 58 for the central alarm system 44 that is syntactically (and optionally semantically) equivalent to a detection message 56 that the central alarm system 44 might otherwise handle from its detection system 48. The detection message 56 may represent a proprietary format.

The central station 50 may present both alarms detected by the alarm sensor 46 and computer alarms detected by the monitoring station 22 in a compatible an integrated manner to an operator of one or more consoles 51. Further, the console operator may respond to an intrusion detection system 28, without directly interacting with the intrusion detection system 28. The alarm interface system 30 handles the difficult interpretation and filtering of the intrusion alarm messages 54 that might otherwise burden the console operator.

The alarm interface system 30 filters intrusion alarm messages 54 that represent computer-related alarms to prevent overloading of the central alarm system 44 or its security personnel staffing the user console 51. The central alarm system 44 may comprise a conventional burglar or fire alarm system that would otherwise be subject to an overwhelming flood of data in the form of the intrusion alarm messages 54.

Figure 2:
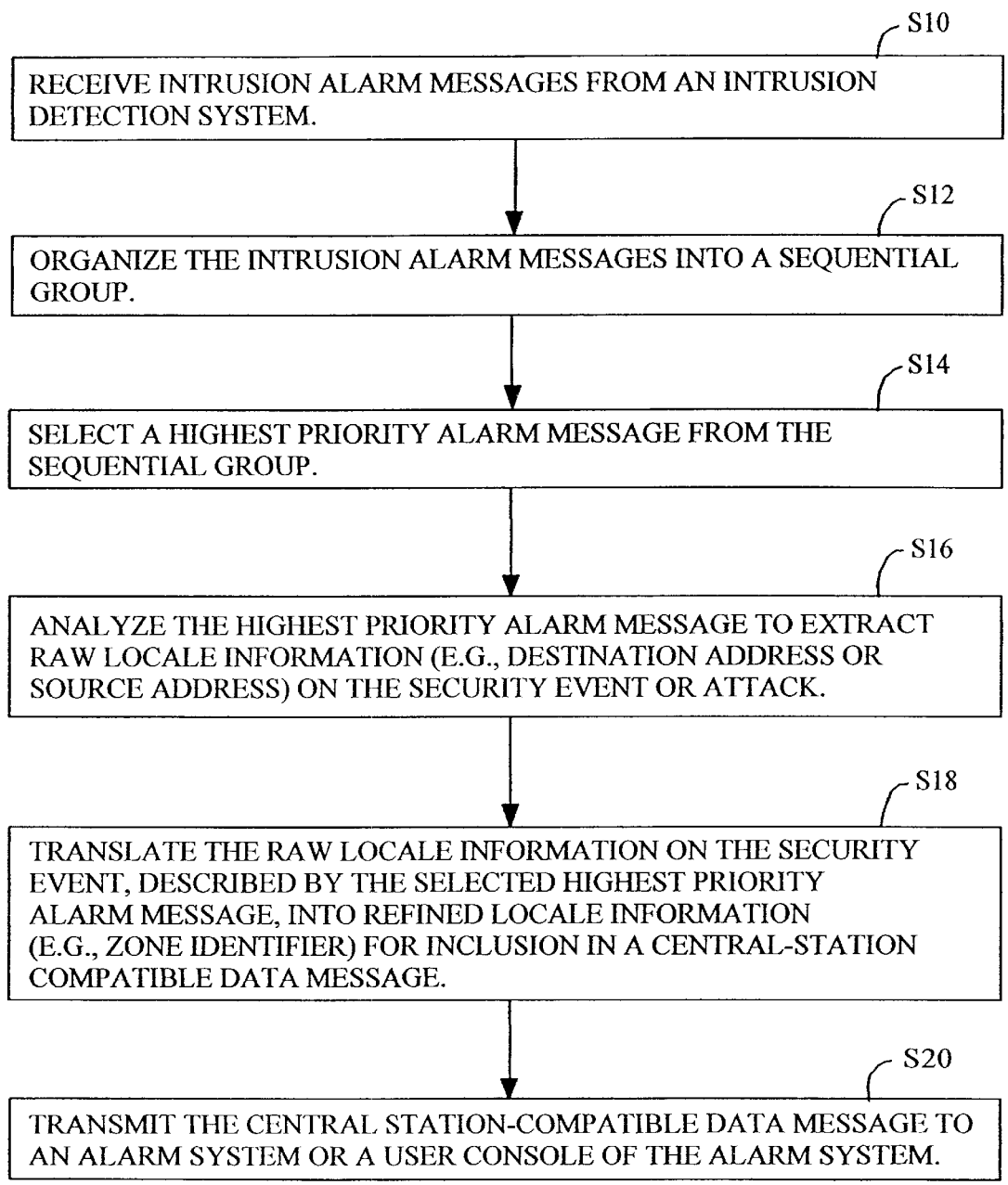
FIG. 2 a flow chart of a method for interfacing an intrusion detection system to a central alarm system in accordance with the invention.

FIG. 2 shows a flow diagram of method for managing an alarm in accordance with the invention. The method of FIG. 2 starts in step S10.

In step S10, a receiver 32 of an alarm interface system 30 receives one or more intrusion alarm messages 54 from an intrusion detection system 28. An intrusion detection system 28 creates an intrusion alarm message 54 in response to the detection of improper activity directed against one or more protected computers 16. The monitoring stations 22 provide the alarm information in the intrusion alarm messages 54. The intrusion alarm messages 54 may, or may not conform to IETF (Internet Engineering Task Force) standards for intrusion alarms.

In one example, the intrusion alarm message 54 may constitute a multikilobyte message containing data about the originating system, the destination system, type of alarm, originating process identifier, date, time, and several additional text fields describing the message data, and related items. The intrusion alarm message 54 may also contain portions of the original data packets transmitted from the monitoring station 22 to the intrusion detection system 26 over the internal communications network 26.

In another example, the intrusion alarms are multi-part messages, or may be supplemented by up to several thousand related messages to describe a coherent set of intrusion events.

In step S12, a sequencer 34 organizes a group of the intrusion alarm messages 54 into a sequential group. The sequencer 34 first holds and stores intrusion alarm messages 54 arriving within a specified time period (e.g., polling cycle duration of monitoring stations 22). Second, the sequencer 34 sequences the intrusion alarm messages 54 by one or more of the following criteria: (1) site affiliation with the site of a protected computer 16, (2) time proximity to related attacks, and (3) event interrelationships between and among successive attack components of a single coordinated attack.

The sequencer 34 collates incoming messages in a manner that represents the sequential process associated with each attack underlying the intrusion alarm message 54. In certain cases, intrusion alarm messages 54 will cover overlapping periods of time. The sequencer 34 will decompose the intrusion alarm messages 54 in a fashion that permits sequential analysis of constituent intrusion events composing an attack. Once the sequencer 34 finishes processing the incoming intrusion alarm message, it passes the processed message off to the priority module 36.

In step S14, a priority module 36 selects a highest priority alarm message from the sequential group organized by the sequencer 34 in step S12. The priority module 36 ensures that the highest priority alarm from a given sequential group is identified for transmission to the central alarm system 44. In this way, the priority module 36 ensures that multiple lower priority alarms or duplicative alarms do not flood the central alarm system 44. In certain cases, intrusion alarm messages 54 are generated that do not represent actual intrusions, but present evidence of intrusion attempts that were not necessarily successful against a computer network. Although such evidentiary intrusion alarm message 54s may create awareness of an intrusion attempt, the priority module 36 of the alarm interface system 30 may assign evidentiary intrusion alarm messages 54 a lower priority than for alarms where an actual intrusion has occurred.

In step S16, an analyzer 38 analyzes the highest priority alarm message to extract raw locale information (e.g., destination address or source address information) or other suitable information that may be processed for subsequent use by the central station 50 of the central alarm system 44. In one example, the analyzer 38 identifies or attempts to identify the source address and destination address of the attack affiliated with the intrusion alarm message 54. However, many types of computer system attacks use spoofed origination and destination addresses. If the attacks are spoofed, messages cannot usually be associated with actual locations on a computer network. In a computer network intrusion that uses spoofing or message broadcasting, true identity of the source address and the target address cannot always be determined. Frequently, intrusion alarm messages 54 arrive at the alarm interface system 30, with invalid source addresses, meaning that the locale for the source is not a reliable indicator of the where the attack originated.

The analyzer 38 may assign a probability indicator to the alarm message based on internal data collected on characteristics of the attack or the security event. The probability indicator is used to estimate one or more of the following: (1) the false alarm rate, (2) the probability of having a valid source indicator (e.g., valid source address) for the attack, (3) the probability of having a valid destination indicator (e.g., valid destination address) for the attack, and (4) the probability of having both a valid source indicator (e.g., valid source address) and a valid destination indicator (e.g., valid destination address) for the attack.

In step S18, a translator 40 translates the raw locale information of the selected highest priority alarm message into refined locale information (e.g., zone identifier) for inclusion in a central station-compatible data message. The raw locale information refers to a received destination indicator, a received source indicator, or other data associated with an intrusion alarm data message. Raw locale information is present in or derived from intrusion alarm messages. Refined locale information represents a distillation of the raw locale information. The refined locale information refers to locale information that is compatible with presentation to an operator via the user console 51, locale information that is compatible with processing by the central station 50, a zone identifier for presentation to an operator by a fire alarm system as the central alarm system 44, a zone identifier for presentation to an operator by a burglar alarm system, or any combination of the foregoing items. The refined locale information may reflect information derived from validation the received destination indicator or the received source indicator, where practical. The translator 40 may access the database 18 and apply known characteristics of the attack to retrieve a preferential zone identifier. The central alarm system 44 may have a user console 51 and procedures for operating on a zone basis. For example, if the central alarm system 44 comprises a burglar alarm system, the console may present the alarms on a zone basis to a console operator.

In step S20, a transmitter 42 transmits the central station-compatible data message to an alarm system or a user console 51 of the alarm system. Accordingly, the central alarm system 44 may simply receive refined locale information (e.g., a zone indicator) that is mapped to a location by the alarm interface system 30. The refined locale information (e.g., zone identifier assignment of the alarm interface system 30) facilitates dispatching of technical personnel or deployment of security countermeasures to counteract illicit computer activity against the protected computer 16 on a real-time basis at a known location of the protected computer.

Figure 3:
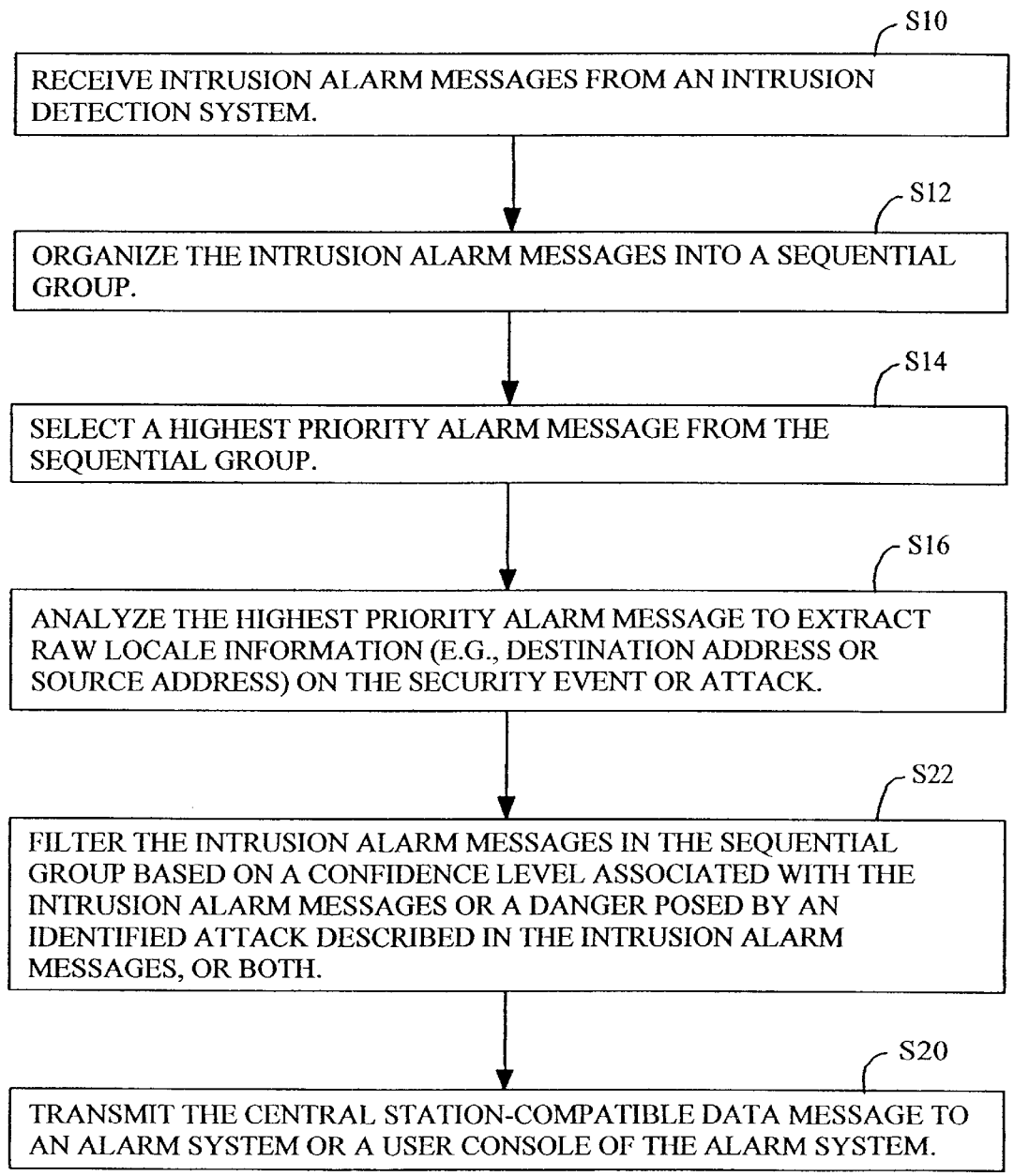
FIG. 3 is a flow chart of another method for interfacing an intrusion detection system to a central alarm system in accordance with the invention.

The method of FIG. 3 is similar to the method of FIG. 2 except step S18 of FIG. 2 is replaced by step S22. Like reference numbers indicate like steps in FIG. 2 and FIG. 3.

In step S22, the filter 13 filters the intrusion alarm messages in the sequential group based on a confidence level associated with the intrusion alarm messages 54, a danger posed by an identified attack described in the intrusion alarm messages, or both the confidence level and the identified attack. The confidence level may be established based upon at least one of the following factors: past experience with a particular type of the intrusion alarms, a number or percentage of false alarms generated from a particular intrusion alarm, a quantitative assessment of specific evaluative criteria used to generate the particular intrusion alarm, and a qualitative assessment of specific evaluative criteria used to generate the particular intrusion alarm. The danger level may be expressed as an estimate of a likelihood of success of the present identified attack based on the success of previous attacks with similar characteristics to the present identified attack. The danger level posed may be established based at least one of the following factors: a network address targeted by the attack, judgment of network operators on the attack, and historic occurrences of attacks and their disposition. Further, the filtering of step S22 may include eliminating duplicative intrusion alarm messages within the sequential group.

The foregoing alarm system leverages the presence of an operating staff who may staff a console for as much as 24hours a day for seven days a week. The foregoing alarm system gives a business entity a jump in thwarting damage or misappropriate of vital computer information stored in a protected computer 16, in an internal computer 52, or in an internal network. Accordingly, the business entity may be able to prevent costly disruptions to ordinary operations by safeguarding data stored on the protected computer 16, the internal computer 52, or otherwise. Further, the business entity may save infrastructure cost by integrating the burglar, fire, and computer network alarms in a common operation center. Duplicative training and personnel are also eliminated by such integration.

The alarm interface system 30 may permit an intrusion detection system 28 to use an existing notification system that notifies or pages computer personnel that can prevent damage to the business entity's internal computer 52 system or accessing of confidential information in a real-time basis, to ameliorate or reduce potential damage. Moreover, large-scale organizations that must monitor hundreds of intrusion detection systems at once can rapidly integrate these systems with a burglar alarm monitoring infrastructure that can quickly and reliably route and track alarms. Further, the alarm interface system 30 are typically designed in a robust fashion to meet strict reliability standards by employing liberal use of redundant components. The alarm interface system 30 facilitates the intrusion detection system 28s use of the robust, redundant architecture components. The fire alarm or burglar alarm may be designed to provide a certain reliability or availability by using a fault tolerant design to maintain operation 24 hours a day and 7 days a week.

The foregoing detailed description is merely illustrative of several physical embodiments of the method and system of the invention. Physical variations of the invention, not fully described in the specification, may be encompassed within the purview of the claims. Accordingly, any narrower description of the elements in the specification should be used for general guidance, rather than to unduly restrict any broader descriptions of the elements in the following claims.

What is claimed is:

1. An alarm interface system comprising:
  a receiver for receiving intrusion alarm messages from an intrusion detection system;
  a sequencer for organizing the intrusion alarm messages into a sequential group based on temporal data associated with the intrusion alarm messages;
  a priority module for selecting a highest priority alarm message from the sequential group of intrusion alarm messages; and
  a translator for translating locale information on a security event or an attack, defined by the selected highest priority alarm message, from raw locale information to refined locale information for incorporation into a central station-compatible data message.

2. The alarm interface system according to claim 1 wherein the raw locale information is based on the intrusion alarm messages and the refined locale information comprises a corresponding zone identifier for a central station.

3. The alarm interface system according to claim 2 wherein the translator associates a received destination indicator with the corresponding zone identifier.

4. The alarm interface system according to claim 2 wherein the translator associates a received source indicator with the corresponding zone identifier.

5. The alarm interface system according to claim 2 further comprising a transmitter for transmitting the zone identifier to the alarm system.

6. The alarm interface system according to claim 1 wherein the translator accesses a database containing relationships among zone identifiers, destination indicators of intrusion alarm messages, and source indicators of intrusion alarm messages.

7. The alarm interface system according to claim 1 further comprising an analyzer for assigning a probability indicator for indicating a probability of having a valid source indicator for an attack.

8. The alarm interface system according to claim 1 wherein the highest priority is selected based on at least one of a confidence level in detection of alarm message and a danger level posed by an attack underlying the alarm message.

9. An alarm interface system comprising:
  a receiver for receiving intrusion alarm messages from an intrusion detection system;
  a sequencer for organizing the intrusion alarm messages into a sequential group;
  a priority module for selecting a highest priority alarm message from the sequential group;
  a translator for translating locale information on a security event, defined by the selected highest priority alarm message, from raw locale information to refined locale information for incorporation into a central station-compatible data message; and
  an analyzer for assigning a probability indicator to the highest priority alarm message to indicate a false alarm rate.

10. An integrated alarm system comprising:
  a protected computer coupled to a communications network;
  an intrusion detection system for detecting a security event or an attack associated with the protected computer and outputting one or more intrusion alarm messages in response to the detection of the security event;
  an alarm system for presenting an alarm at a user console based on an input of a detection message; and
  an alarm interface system for filtering and converting the intrusion alarm messages into central-station compatible data messages compatible with presentation to a user via the user console.

11. The integrated alarm system according to claim 10 wherein the alarm interface system includes a translator for translating at least one of a destination indicator and a source indicator of a security event, as indicated by the intrusion alarm messages, into a corresponding zone identifier for incorporation into the central station-compatible data message for the alarm system.

12. The integrated alarm system according to claim 10 wherein the alarm system is burglar alarm system with a fault-tolerant design featuring redundant components.

13. The integrated alarm system according to claim 10 wherein the alarm system is a fire alarm system with a fault tolerant design featuring redundant components.

14. The integrated alarm system according to claim 10 further comprising:
  a firewall associated with the protected computer to protect the protected computer from unauthorized traffic, the intrusion detection system outputting intrusion alarm messages that include security-related events affiliated with the firewall.

15. A method for interfacing an alarm system, the method comprising the steps of:
  receiving intrusion alarm messages from an intrusion detection system;
  organizing a sequential group of the alarm messages based on temporal data associated with the intrusion alarm messages;
  selecting a highest priority alarm message from the sequential group; and
  translating raw locale information of a security event or an attack, described by the selected highest priority alarm message, into corresponding refined locale information for an alarm system.

16. The method according to claim 15 wherein the raw locale information comprises information derived from the intrusion alarm messages and wherein the refined locale information comprises a distillation of the derived information.

17. The method according to claim 15 wherein the refined locale information comprises a zone identifier, the zone identifier derived from the corresponding raw locale information.

18. The method according to claim 17 wherein the translating step includes associating a received destination indicator with the corresponding zone identifier.

19. The method according to claim 17 wherein the translating step includes associating a received source indicator with the corresponding zone identifier.

20. The method according to claim 15 wherein the translating step includes formatting the refined locale information for subsequent processing by one of a fire alarm system and a burglar alarm system.

21. The method according to claim 15 wherein the translating step includes accessing a database containing relationships among zone identifiers, destination indicators of security events, and source addresses of security events.

22. The method according to claim 15 further comprising the step of transmitting the zone indicator to the alarm system to indicate the affiliation of an alarm with a zone for a user of a user console.

23. The method according to claim 15 further comprising the step of assigning a probability indicator for indicating a probability of having a valid source indicator for an attack.

24. A method for interfacing an alarm system, the method comprising the steps of:
receiving intrusion alarm messages from an intrusion detection system;
organizing a sequential group of the alarm messages based on temporal data associated with the intrusion alarm messages;
selecting a highest priority alarm message from the sequential group;
translating raw locale information of a security event or an attack, described by the selected highest priority alarm message, into corresponding refined locale information for an alarm system; and
assigning a probability indicator to the highest priority alarm message to indicate a false alarm rate.

25. An alarm interface system comprising:
a receiver for receiving intrusion alarm messages from an intrusion detection system;
a sequencer for organizing the intrusion alarm messages into a sequential group based on temporal data associated with the intrusion alarm messages; and
a filter for filtering the intrusion alarm messages in the sequential group based on at least one of a confidence level associated with the intrusion alarm messages and a danger posed by an identified attack described in the intrusion alarm messages.

26. The alarm interface system according to claim 25 wherein the filter comprises a priority module in communication with the sequencer.

27. The alarm interface system of claim 25 wherein the filter is coupled to a translator for translating raw locale information of a security event, described by the selected highest priority alarm message, into corresponding refined locale information for an alarm system.

28. The alarm interface system of claim 25 wherein the priority module accesses a database for storage and retrieval of criticality levels associated with corresponding network addresses, wherein the criticality levels indicate a significance to a network operator concerning an attack upon a corresponding network address.

29. The alarm interface system of claim 25 further comprising a transmitter and wherein the filter blocks data messages for transmission from the transmitter to a central station.

30. A method for managing alarm messages, the method comprising:
receiving intrusion alarm messages from an intrusion detection system;
organizing the intrusion alarm messages into a sequential group based on temporal data associated with the intrusion alarm messages;
filtering the intrusion alarm messages in the sequential group based on at least one of a confidence level associated with the intrusion alarm messages and a danger posed by an identified attack described in the intrusion alarm messages.

31. The method according to claim 30 wherein the filtering step includes eliminating duplicative intrusion alarm messages within the sequential group.

32. The method according to claim 30 wherein the filtering step includes the step of establishing the confidence level based upon at least one of the following factors: past experience with a particular type of the intrusion alarms, a number or percentage of false alarms generated from a particular intrusion alarm, a quantitative assessment of specific evaluative criteria used to generate the particular intrusion alarm, and a qualitative assessment of specific evaluative criteria used to generate the particular intrusion alarm.

33. The method according to claim 30 wherein the filtering step includes the step of establishing the danger level of an attack based on at least one of the following factors: a network address targeted by the attack, judgment of network operators on the attack, and historic occurrences of attacks and their disposition.

34. The method according to claim 30 wherein the filtering step includes the step of estimating a likelihood of success of the present identified attack based on the success of previous attacks with similar characteristics to the present identified attack.

35. The method according to claim 30 wherein the filtering step includes the step of estimating a financial severity of a successful attack on a victim if a likelihood of success of the attack exceeds a minimum threshold.

* * * * *